Patented Oct. 18, 1949

2,485,239

UNITED STATES PATENT OFFICE 2,485,239

POLYMERS CONTAINING RECURRING ALDEHYDE GROUPS AND DERIVATIVES THEREOF AND PROCESS FOR PREPARING SAME

Emmette Farr Izard, Kenmore, N. Y., assignor to E. I. du Pont de Nemours & Company, Wilmington, Del., a corporation of Delaware No Drawing. Application March 6, 1945,
Serial No. 581,340

3 Claims. (Cl. 260—67)

This invention is concerned with novel synthetic polymeric materials and it is directed particularly to polymers containing reactive aldehyde groups and to derivatives thereof.

Many of the synthetic polymers heretofore prepared had limited utility because of their inability to be converted readily into products having different physical characteristics, particularly with respect to solubility and heat resistance. This is particularly true of the vinyl polymers heretofore known, many of which are soluble and fusible, but which are not readily converted to the insoluble and infusible state. Unsaturated aldehydes such as acrolein, methacrolein and crotonaldehyde contain a carbon-to-carbon unsaturation which would indicate a readiness to polymerize, but in the polymerization of these aldehydes both the carbon-to-carbon unsaturation and the aldehyde groups enter into the polymerization, with the rapid formation of infusible, insoluble products which, because of their infusibility and insolubility, have very limited utility as far as industrial products are concerned.

One object of this invention is concerned with the preparation of novel polymers which, in the polymeric state, contain sufficient reactive groups to be readily converted to products having different characteristics particularly with respect to solubility and resistance to heat. A further object of the invention is concerned with polymers having reactive aldehyde groups and capable of cross-linking whereby to effect a desired change in physical and chemical characteristics. Other objects will appear hereinafter.

The objects of the invention are accomplished in general by polymerizing chemical compounds containing a carbon-to-carbon unsaturation and having a group or radical which is inactive as far as polymerization is concerned, said inactive group in the resulting polymer being readily converted by hydrolysis, alcoholysis or saponification to aldehyde groups. In view of the inert character of said inactive groups with respect to polymerization and their ready conversion to aldehyde groups, these groups will be referred to hereinafter as "masked aldehyde" groups. Such polymers containing aldehyde groups can thereafter be readily reacted to produce cross-linking as will be explained more in detail hereinafter with a concomitant change in chemical and physical characteristics. Because of the masking of the aldehyde groups which are potentially contained in the monomeric material and in the polymers produced therefrom, the polymers are linear in character and may be of very high molecular weight. It is preferred that the polymers finally produced contain not only aldehyde groups, but also hydroxyl groups since these groups can cross-link with each other between identical molecules and produce the desired change in solubility, fusibility and other characteristics. Polymers of this desired type may be obtained by interpolymerizing a material such as allylidene diacetate and vinyl acetate, when mixed in a mol ratio of 1:2, to produce an alcohol-soluble polymer having the following structure:

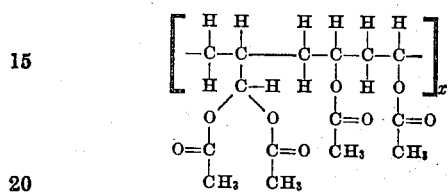

This structural formula is designated as Formula 1 and assumes a head-to-tail linking of allylidene diacetate and vinyl acetate such as occurs in the polymerization of vinyl acetate by itself, allylidene diacetate likewise presumably polymerizing by itself in the same head-to-tail fashion. The carbon atoms in the horizontal chain of Formula 1 are chain carbon atoms for convenience. Upon hydrolysis, saponification or alcoholysis in an alkaline medium, the ester groups are removed to yield a product having the polymer chain structure:

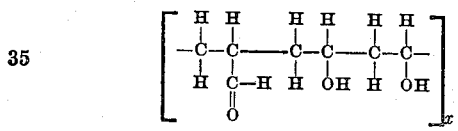

This structural formula is designated as Formula 2. This polymeric compound is stable, provided it is not subjected to elevated temperature and/or acid conditions. In an acid medium, this intermediate product automatically cross-links with the liberation of water to form an insoluble, substantially infusible product, such as is represented by the following structure:

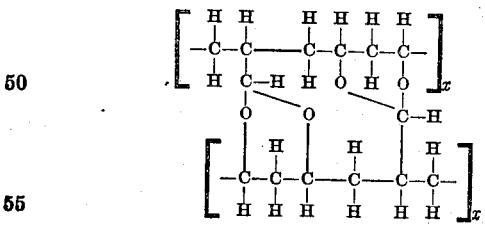

This structural formula is designated as formula 3.

The subscript "$x$" occurring in the above Formulas 1, 2 and 3 represents the number of chain units in the polymer molecule.

While the "masked" aldehyde group

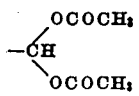

is shown directly connected to the polymeric chain, and compounds of this general type are preferred in view of the availability of materials and simple synthesis, but the invention is not so limited. The above or an equivalent masked aldehyde group may be connected to the chain carbon atom either directly as shown above in Formula 1, or through one or more carbon atoms, or through any line of attachment that is free of hydrolyzable linkage, i. e. free of a linkage that will be severed by hydrolysis, saponification or alcoholysis. The importance of non-hydrolyzable linkage is obvious for, if hydrolysis, or alcoholysis or saponification which unmasks the aldehyde group also breaks the linkage between the aldehyde group and the polymeric chain, the polymer loses its aldehydic character and the properties flowing from the presence of aldehyde groups in the polymer molecule.

Thus, it is important in the polymers which can be saponified to yield aldehyde groups, that the polymeric structure contain a dangling carbon atom having two valences saturated with hydrolyzable groups which take no part in the polymerization reaction. Allylidene esters and alpha-substituted allylidene esters constitute a preferred family of compounds capable of being polymerized to yield linear addition polymers of this character. Allylidene diacetate may be prepared by reacting acrolein with excess acetic anhydride. Acrolein ($CH_2=CH-CHO$) contains the double bond needed for linear addition polymerization, but the aldehyde group interferes with direct polymerization as stated above. The aldehyde group must therefore be covered or "masked" to prevent it from reacting and interfering with the synthesis of the linear polymer. The attachment of two ester groups is simple and generally preferred, but the aldehyde may otherwise be immobilized or "masked," e. g. the aldehyde may be covered by other groups such as ether, thioether or halogen groups, or by any combination of "masking" groups, i. e. in part by an ester group and in part by other masking groups, and used with very satisfactory results.

In the illustration given above, both cross-linking groups (—CHO and —OH) are present or potentially available in the same polymer and generally, this is desirable but not at all necessary in order to have synthetic addition polymers of improved utility. Many polymers, natural and synthetic, have hydroxyl groups that will cross-link with the aldehyde groups contained in the polymer that may be formed through the practice of this invention. For instance, cellulose, partially substituted cellulose derivatives, glycol cellulose, polyvinyl alcohol or interpolymers thereof are excellent materials with which to effect cross-linkage. Furthermore, there are numerous polyfunctional compounds such as di- and polyhydric alcohols, e. g. glycerol, the glycols, polythioalcohols and diamines which may be used effectively to cross-link polymers formed through the practice of this invention when the polymer itself contains no hydroxyl groups. In some cases, it may even be desirable to effect cross-linking reactions such as were just previously discussed, even though the polymer itself contains hydroxyl groups.

To produce polymers of certain solubility characteristics, the masked aldehyde compound may be interpolymerized with a major proportion of certain other ethylenic compounds having the desired solubility characteristics so that the aldehyde-containing polymer eventually formed may be used more advantageously. In the case of interpolymers of allylidene diacetate and vinyl acetate for example, a high mol ratio of vinyl acetate to allylidene diacetate, such as 10:1 or 20:1, gives polymers which, upon saponification, are readily water soluble. After such polymers have been saponified and then subjected to cross-linking under such conditions as to consume all of the aldehyde groups, there will still remain free a large percentage of the original hydroxyls which confer on the polymer relatively high water sensitivity (a large capacity for swelling in water) even though the polymer is no longer water soluble. In such cases, it may be desirable to acetalize all or part of the remaining hydroxyls with an aldehyde such as formaldehyde, acetaldehyde, butyraldehyde, etc. Sometimes it may be advantageous to have both cross-linking groups present in the ultimate polymer to only a minor extent, in which case a three or four component polymer may be produced.

This invention utilizes generally synthetic linear addition polymeric compounds containing in the chain the group:

(A)
$$\left]-\underset{H}{\overset{R_a}{\underset{|}{C}}}-\underset{|}{\overset{R_b}{C}}-\right[$$

wherein $R_a$ and $R_b$ are monovalent atoms or radicals, e. g. hydrogen, halogen, aryl, aralkyl or substituted or unsubstituted, saturated or unsaturated, open chain or cyclic alkyl and are preferably hydrogen, halogen or a saturated aliphatic hydrocarbon radical, the said group having joined thereto through the valence shown in the formula as unsatisfied and through a line of attachment free of hydrolyzable linkage the group:

(B)
$$-C\underset{R_2}{\overset{R_1}{\diagup}}$$

wherein $R_1$ and $R_2$ are acyloxy (including aroyloxy), alkoxy, alkylthio, aralkoxy, aralkylthio or halogen and both $R_1$ and $R_2$ are free of unsaturated acyclic carbon-to-carbon bonds. In order that the line of attachment be free of hydrolyzable linkage, the group B must be directly connected to carbon which may or may not be the carbon of the polymeric chain. In the preferred embodiment of this invention, group B is directly connected to group A. Examples of monomeric compounds capable of forming this type of polymer are allylidene diacetate, 2-methallylidene diacetate, 2-phenyl allylidene diacetate, allylidene acetate-chloride, allylidene acetate-ethoxide, 2-chloroallylidene diacetate, allylidene dipropionate, crotylidene diacetate, cinnamylidene diacetate, acrolein diethoxide, acrolein chloride-ethoxide, acrolein dichloride, vinyl dioxolane, allylidene dibenzoate, allylidene benzoate-acetate, allylidene benzoate-ethoxide, vinyl benzylidene diacetate and vinyl naphthal diacetate.

While the above-mentioned monomeric compounds may be polymerized alone, it is generally preferred to interpolymerize one of these compounds with one or more ethylenic compounds having the general formula:

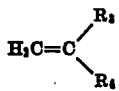

where $R_3$ is hydrogen, halogen or methyl and $R_4$ is hydrogen, halogen, methyl, methoxy, cyano, alkenyl, substituted alkenyl, alkinyl, acyloxy, acylthio, carbalkoxy, acyloxyalkyl, aryl, aralkyl, carbazyl, or pyridyl. Satisfactory interpolymerizing compounds include vinyl acetate, vinyl thioacetate, vinyl chloride, vinyl cyanide, vinyl fluoride, styrene, butadiene, chloroprene, isobutylene, methylacrylate, methyl, methacrylate, vinylidene chloride, ethylene, vinyl acetylene, vinyl carbazol, vinyl pyridine, etc.

Where monomeric compounds are used as the starting materials, polymerization may be carried out in any suitable manner commonly practiced for the production of polymeric vinyl compounds. As previously stated, the allylidene ester or the like may be polymerized alone, in which case the polymer will contain only masked aldehyde groups, or it may be interpolymerized with other unsaturated compounds which may or may not contain masked hydroxyls. If desired, two, three or more interpolymerizing compounds may be combined with the masked aldehyde compound. The mol ratio of the masked aldehyde compound to the other interpolymerizing ingredient may vary widely, for instance from 1:2 to 1:20, more or less, depending upon the specific characteristics desired. Also, the degree of polymerization may range widely, the polymeric compounds having molecular weights of from 1,000 to 100,000 or more.

The present invention resides in a new class of synthetic linear addition polymers which contain reactive aldehyde groups attached to a chain carbon through non-hydrolyzable linkage. When these polymers also contain free hydroxyl groups they are capable of being cross-linked into an insoluble and infusible, or difficultly fusible form. In order that the aldehyde group be reactive, it must be joined to the polymeric chain through a carbon-to-carbon bond, i. e. the structure

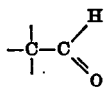

must be present. The aldehyde carbon may be connected directly to the polymeric chain carbon, or it may be connected to the chain carbon through one or more additional carbons or through oxygen, so long as the linkage is free of hydrolyzable groups. When connected through oxygen, the other two valences of the carbon atoms adjacent the oxygen must be satisfied only with monovalent members, e. g. hydrogen or hydrocarbon, for if satisfied by oxygen or the like, the side chain will be split off upon hydrolysis. When adjacent connectors are carbon, a carbonyl group is not objectionable.

The aldehyde groups may be formed from the masked aldehyde group containing polymer of the type previously set forth by hydrolysis in acid medium, by acid catalyzed alcoholysis, by saponification in an alkaline medium or by an alkaline catalyzed alcoholysis. (For convenience, the term "hydrolysis" can be used to designate the "unmasking" reaction where a general term is desired for the purpose of referring to this reaction although the term "hydrolysis" is frequently given its more restricted meaning throughout this specification.) Hydrolysis or alcoholysis in acid medium is preferably confined to those polymers containing no masked hydroxyls. Otherwise, the unmasked aldehyde and hydroxyls will immediately react in the acid medium to cross-link and insolubilize the structure. However, the acid method is not only entirely satisfactory, but the acid catalyzed alcoholysis method is preferred where there are no masked hydroxyl groups in the initial polymer.

Whenever the aldehyde group is masked in an interpolymer by an acetal, hydrolysis or alcoholysis is somewhat more difficult and it must be carried out in an acid medium. It is desirable therefore if interpolymers are involved to have no masked hydroxyls present to interfere with the reaction in acid medium. Half acetals such as polyallylidene acetate-ethoxide may be hydrolyzed or saponified either in alkaline or acid medium. When the alkaline saponification or alcoholysis is used, the masked aldehyde may not be unmasked immediately, for while the ester group is readily replaced by hydroxyl, the ether group may remain intact for a time although eventually the aldehyde will be unmasked.

The following examples in which parts, proportions and percentages are by weight unless otherwise specified illustrate typical methods for applying the principles of the invention.

*Example I*

A mixture of 860 grams of vinyl acetate, 160 grams of allylidene diacetate, 1,800 grams of water, 2 grams of sodium bicarbonate and 1 gram of polyvinyl alcohol (obtained by hydrolyzing polyvinyl acetate until the molecule contains 11% of the maximum theoretical acetyl content) was heated to reflux for five minutes to drive all air out of the system and 1 gram of benzoyl peroxide catalyst was added. The mixture was heated with stirring at the reflux temperature for a total of eight hours at which time the product was refluxing at 90° C. Evidently, all the vinyl acetate had been consumed. The product was cooled to room temperature, with stirring, and then allowed to settle. After washing by decantation and air drying, the polymer was found to weigh 790 grams. The product is an interpolymer of allylidene diacetate and vinyl acetate.

This polymer (790 grams) was dissolved in 2,000 cc. of methanol by stirring at 60° C. To this solution was added portionwise a solution of 40 grams of sodium hydroxide in 360 grams of methanol. During the addition of about half of the sodium hydroxide, the pH did not change materially and did not rise above 7.0 to 8.0. (This indicates the rapid saponification of some component of the polymer and is believed to be due to the more rapid saponification of the allylidene diacetate portion.) Continued addition of sodium hydroxide eventually brought the pH up to 9.0 to 10.0 at which point a mild yellow color developed in the solution and in about fifteen minutes at 55° C. cloudiness developed, quickly followed by considerable thickening of the solution. Finally, the solution "broke," solid polymer separated out and the viscosity dropped very rapidly due to the fact that all the polymeric material rapidly came out of solution as saponified product. In order to insure complete alcoholysis, heating was continued for two hours at 55° C. with periodic additions of sodium hydroxide to keep the pH near 10.0. After two hours the product was separated from the alcohol by filtration, washed thoroughly to remove the reaction by-products and then dried in air. The air dry product weighed 376 grams and was readily soluble in water. However, this polymer would tolerate considerable alcohol and the alcohol wet polymer first produced rapidly dissolved in water to give a very satisfactory solution.

The caustic-alcohol treatment described in this example constitutes an alcoholysis effecting splitting off of the ester groups such as was shown in Formula 1, with the unmasking of the hydroxyl and aldehyde groups as was shown in Formula 2, methyl acetate being largely produced during the reaction.

Example II

A mixture of 80 grams of methyl methacrylate and 32 grams of allylidene diacetate was added to 200 grams of water containing 0.2 gram of sodium bicarbonate and 0.2 gram of polyvinyl alcohol (the same composition as the polyvinyl alcohol used in Example I). The mixture was heated to reflux for fifteen minutes to remove all air and then 0.2 gram of benzoyl peroxide was added while stirring and heating were continued. Within an hour, polymerization was well under way and at the end of four hours, polymerization was complete as evidenced by the rise in boiling point of the solution. The product was cooled to room temperature and was obtained in the form of irregular beads. The final, air dry product weighed 100 grams and was clear and transparent, indicating perfect compatibility and was an interpolymer of allylidene diacetate and methyl methacrylate.

One hundred (100) grams of this interpolymer were dissolved in 200 grams of beta-methoxyethanol and then carefully diluted with 100 grams of methanol. Since methanol is not a solvent for this polymer, this addition almost caused coagulation. Seven (7) grams of sodium methoxide in beta-methoxyethanol were added slowly to this solution to give a pH of 8.0 to 9.0. During heating, the pH slowly dropped and additional sodium methoxide was added to keep the pH near 9.0. On cooling, this solution gelled. It was warmed up and 100 grams of beta-methoxyethanol added to redissolve the mixture and the final solution was poured into hot water to coagulate the resin. The final polymer was soluble in a mixture of toluol and beta-methoxyethanol. Inasmuch as sodium methylate did not cause alcoholysis of the methyl methacrylate portion of this polymer, the only alcoholysis that could have taken place was that of the allylidene diacetate which set free the aldehyde groups.

Example III

A mixture of 36 grams of vinyl acetate, 36 grams of allylidene diacetate and 0.36 gram of benzoyl peroxide was heated to reflux on a steam bath. Polymerization started in about fifteen minutes and proceded normally and rapidly. After the vigorous reaction was over, the mixture was heated on a steam bath for sixteen hours to insure complete polymerization.

This polymer was dissolved in 200 cc. of methanol. To make this solution alkaline, 50% aqueous caustic was cautiously added. During the addition of this caustic and subsequent refluxing, no evidence of coagulation appeared. The caustic solution was continually added until a total of about 10 grams of sodium hydroxide had been added. During this addition, some darkening of the product took place, but it did not become water soluble. (However, the addition of a small amount of hydrochloric acid to the alcohol solution to make it acid resulted in immediate gelation to an alcohol-insoluble product. In this case, saponification or alcoholysis had taken place, but the product was not soluble in water.) The product was finally coagulated by pouring the solution into cold water and washing several times with water to remove by-products. This precipitated product would not redissolve in methanol nor in water alone, but did redissolve in a 50% aqueous methanol solution. Acidification of this water-alcohol solution as above described resulted in immediate gelation, indicating the presence of both aldehyde and alcohol groups.

Example IV

A mixture of 110 grams of methyl methacrylate and 13 grams of allylidene diacetate was added to 200 grams of water containing 0.3 gram of sodium bicarbonate and 0.2 gram of polyvinyl alcohol (the same composition as the polyvinyl alcohol used in Example I). The mixture was heated to reflux for fifteen minutes to remove all the air and then 0.2 gram of benzoyl peroxide was added while stirring and heating were continued. Within an hour, polymerization was well under way and at the end of four hours, polymerization was complete, as was evidenced by the rise in boiling point of the solution. The product was obtained in the form of irregular beads and after washing and drying, weighed about 110 grams.

One hundred ten (110) grams of the product above described were dissolved in 700 grams of methoxyethanol to give a very viscous solution when cooled. When warmed on a steam bath the solution became somewhat thinner and 2 grams of sulfuric acid were added and heating continued with good stirring at 80° to 85° C. for four hours. During this period, the solution became much lower in viscosity as hydrolysis proceeded. After hydrolysis, the viscosity of the solution, even at room temperature, is quite low, indicating a material change in the character of the polymer. The sulfuric acid catalyst was neutralized with sodium hydroxide and a film cast from the solution. The dried film was perfectly clear and transparent. Qualitative tests indicated the presence of the aldehyde groups in this polymer.

Example V

A copolymer of vinyl benzylidene diacetate and vinyl acetate prepared in a manner similar to the procedure outlined in Example I and subjected to alkaline alcoholysis as described in Example I yields a synthetic linear addition polymeric product having both free aldehyde and free hydroxyls. In this case the aldehyde is linked to the chain carbon through additional carbon bonds to give the structure:

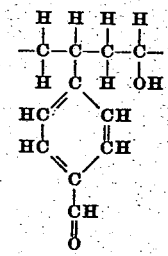

but upon acid treatment, the cross-linking reactions take place as previously described, as is evidenced by greatly increased insolubility characteristics.

Example VI

A solution of polyvinyl alcohol in liquid ammonia was prepared by adding 4.4 grams of polyvinyl alcohol to about 400 grams of ammonia with good stirring. Two and three-tenths (2.3) grams of sodium, likewise dissolved in liquid ammonia, were added to the above solution and a white precipitate of sodium polyvinyl alcoholate resulted. The liquid ammonia was evaporated from this product and dry xylene added as a reaction medium. Fifteen and two-tenths (15.2) grams of diethyl chloro-acetal were added to this mixture, with good stirring, and the mixture heated on a steam bath for two to three hours. The product of the reaction was still soluble in water, but was quite sensitive to methanol, indicating that a substantial portion of the hydroxyl groups had been substituted. The above polymer was removed from the xylene by filtration and washed to remove excess diethyl chloro-acetal.

It is believed that the polymer thus obtained may be shown structurally as follows:

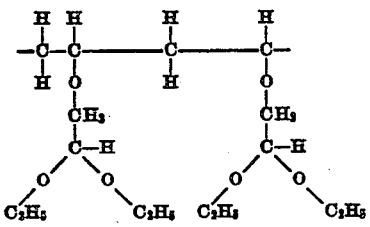

When this polymer in aqueous solution is hydrolyzed by means of acid, the ethyl groups are removed and the aldehyde formed. If any unreacted hydroxyls still exist in the polymer, they will immediately react with some of the free aldehyde groups to form a cross-linked structure.

Example VII

A mixture of—

| | | |
|---|---|---|
| Acrylonitrile | grams | 40 |
| Allylidene diacetate | do | 5 |
| Vinyl acetate | do | 5 |
| Distilled water | do | 97 |
| Sodium triisopropyl naphthalene beta-sulfonic acid | grams | 2.7 |
| Monosodium phosphate | do | 0.71 |
| Ammonium persulfate | do | 0.086 |
| Metasodium bisulfite | do | 0.043 |
| Sodium hydroxide (0.5 N) | cc | 0.2 | was heated for eighteen hours in a pressure bottle at 23° C. with constant agitation, during which time the mixture polymerized and precoagulated in the form of a white, grainy polymer which was easily washed free of salt. The dried product weighed 39 grams and contained 21.4% nitrogen which corresponds to 81% acrylonitrile in the polymer. This product was soluble in dimethyl formamide, but insoluble in acetone and acetonitrile. A film was cast from this product by spreading a solution of the polymer in dimethyl formamide on a suitable surface, followed by evaporation of the dimethyl formamide. The film, after removal of the solvent, was stripped from the casting surface and was immersed in a hydrolysis bath consisting of 5% sulfuric acid in water, the pH of the bath being approximately 1.0. The bath was heated to the boiling point for about one hour and the film was left therein at room temperature for an additional two days, after which period the film was insoluble in, but swollen in boiling dimethyl formamide, indicating that as the hydrolysis proceeded in an acid medium, acetal formation also took place.

Example VIII

A mixture of—

| | | |
|---|---|---|
| Acrylonitrile | grams | 40 |
| Allylidene diacetate | do | 10 |
| Distilled water | do | 70 |
| Sodium triisopropyl naphthalene beta-sulfonic acid | grams | 2.7 |
| Monosodium phosphate | do | 0.71 |
| Metasodium bisulfite | do | 0.043 |
| Ammonium persulfate | do | 0.086 |
| Sodium hydroxide (0.5 N) | cc | 0.2 | was heated at 23° C. with constant agitation for a period of eighteen hours. The yield of polymer was 30.5 grams and the product was soluble in dimethyl formamide.

In a different, large scale interpolymerization similar to the above, the product contained 22.6% nitrogen, indicating an 88/14 interpolymer, i. e. one containing 86% by weight of acrylonitrile and 14% by weight of allylidene diacetate in the polymer molecule. The product had a molecular weight of 62,000 (calculated). A film was cast from a solution of the interpolymer in dimethyl formamide and immersed in a 5% aqueous solution of sulfuric acid in the same way and for the same periods of time as in Example VII, but at the end of the two day period of immersion at room temperature in the acid medium, the film did not become insoluble as did the film of Example VII, indicating that the formation of the aldehyde groups alone was not sufficient to give a cross-linked product.

The polymerization catalysts used include those which catalyze the polymerization of vinyl compounds, e. g. vinyl acetate; organic peroxides such as benzoyl peroxide and diethyl peroxide as well as other per- compounds such as ammonium persulfate (which may be activated by bisulfites such as sodium bisulfite and metasodium bisulfite) are effective catalysts for the polymerization.

The aldehyde group-containing polymers described above, in view of their relatively low softening points and their solubility in many solvents, are readily formed either by the wet or coagulation method, by the dry or evaporative method, or by the melt method of spinning or casting into all sorts of shaped articles such as sheets, films, wrapping tissue, tubing, filaments, bristles, yarns, threads and the like. Also, they may be used in various compositions such as for coating, finishing, casting or molding, for adhesion, lamination and the like. They may be admixed with natural or other synthetic polymeric materials, added to spinning or casting dopes of filament- or film-formers and spun or cast into filaments or film. Specifically, the interpolymers comprised of vinyl acetate are especially useful in cellulose acetate or other cellulose ester or cellulose ether compositions and when formed structures thereof are converted by saponification into either partially or wholly regenerated cellulose, the aldehyde group-containing polymer will simultaneously be formed, the aldehyde groups of which, if alkaline saponification is used, may subsequently be consumed to effect cross-linking within the structure to render the same stronger, tougher and more resistant chemically. When the cellulose ester is hydrolyzed under acid conditions to remove acetyl groups to whatever desired degree, the masked aldehyde polymer is converted to a polymer having aldehyde groups which are at the same time cross-linked with the hydroxy group of the cellulose compound. In fact, any structure such as is mentioned above as comprised of or containing the masked aldehyde polymer of this invention may be converted into an insoluble and difficultly fusible form by unmasking the aldehyde group of the polymer under such acid conditions as will cause it to react and produce cross-links.

By the practice of this invention, one can obtain water soluble polymers by converting suitable masked aldehyde polymers of the type described above, e. g. the allylidene diacetate-vinyl acetate polymers, by saponification, or by alcoholysis in an alkaline medium into the aldehyde-containing, hydroxy-containing polymers which will remain water soluble so long as they are not acidified. These water soluble, aldehyde-containing polymers are likewise readily formed into any desired shape and are admirably suited for use wherever regenerated cellulose or polyvinyl alcohol structures have previously been used. In view of their subsequent simple insolubilization whenever desired which renders the structures water insoluble, these polymers may often be used with greatly improved results. These water soluble polymers may, for example, be used as adhesives for cellophane, paper, cloth and various organic and inorganic substances; as adherent, permanent finishes for fabrics or as permanent sizes for yarns, particularly nylon. These self-insolubilizing polymers are useful in producing protective coverings, especially for those uses where water sensitivity is harmful. In polarizing structures, they are much less sensitive to moisture than is polyvinyl alcohol, commonly used for this purpose heretofore. They are useful as substitutes for Holland cloth or as sausage casings.

Polyvinyl alcohol is incompatible with viscose and even on xanthation, does not give a smooth, uniform mixture. However, hydrolyzed interpolymers of this invention comprised largely of polyvinyl alcohol are miscible with viscose and such solutions may be spun or cast to produce filaments, yarns, films and the like having very interesting properties. When such compositions are extruded into coagulating, but non-regenerating baths, the aldehyde group is not altered and the products may subsequently be stretched or otherwise worked or modified before effecting cross-linking within the structure.

The hydrolyzed interpolymers of this invention comprised of polyvinyl alcohol can be hot drawn in a manner similar to the drawing of polyvinyl alcohol. Considerable of the increased strength brought about by the drawing is maintained after insolubilization. Furthermore, structures exhibiting strong shrinkage characteristics may be obtained by such drawing procedures which are well suited for use as shrinkable wrappers. For instance, films of hydrolyzed interpolymers of allylidene diacetate and vinyl acetate have been drawn as much as 600% and after cross-linking, have been found to shrink to half this drawn length. On the other hand, if the film is insolubilized first, while it can be drawn only about 300% and will retain this new length so long as it is kept cool and dry upon heating or wetting out in water, these films recover completely their original undrawn dimensions.

The term "polyvinyl alcohol" is generally used throughout this specification to describe a polyvinyl product containing a sufficiently large proportion of hydroxyl groups in the molecule to render the polymer soluble in water which may in some instances be heated, the hydroxyl content being in the neighborhood of 70% or more of the theoretical maximum and obtained, for example, by hydrolyzing polyvinyl acetate until all but a small percentage, e. g. 30% or less, of the theoretical acetyl maximum content is split off.

The polymers of this invention are useful in the preparation of polymeric dye intermediates. For example, the hydrolyzed or saponified polymers containing the aldehyde groups can be reacted with a monomeric dye intermediate containing an aldehyde-reactive group. Such polymeric dye intermediates have been found of value in processes of color photography.

The hydrolyzed, aldehyde group-containing polymers of this invention are also useful in the preparation of dispersions of silver halide, of interest in photography.

In view of the solubility of the unhydrolized polymers containing the masked aldehyde groups, particularly the type exemplified by the interpolymer of allylidene diacetate and vinyl acetate, in organic solvents, they may be applied to organic solvent-soluble base materials, the solvent then being eliminated and the polymer hydrolyzed or saponified to the state in which it is water soluble or water swellable and compatible with any water sensitive coating materials, the coating then being applied and a firm anchoring of the coating to the base by means of the hydrolyzed or saponified polymer intermediate coating resulting.

Any departure from the description given above which conforms to the principles of the invention is intended to be included within the scope of the claims.

I claim:
1. The polymer obtained by hydrolyzing the interpolymer of allylidene diacetate and vinyl acetate said polymer containing recurring aldehyde and hydroxy groups.
2. The process which comprises hydrolyzing an interpolymer of allylidene diacetate and vinyl acetate whereby to form a polymer containing recurring aldehyde and hydroxy groups.
3. The process which comprises hydrolyzing in an alkaline medium an interpolymer of allylidene diacetate and vinyl acetate whereby to form a polymer containing recurring aldehyde and hydroxy groups.

EMMETTE FARR IZARD.

REFERENCES CITED

The following references are of record in the file of this patent:

UNITED STATES PATENTS

| Number | Name | Date |
| --- | --- | --- |
| 1,625,852 | Herrmann | Apr. 26, 1927 |
| 1,970,510 | Ellis | Aug. 14, 1934 |
| 2,178,523 | Schmidt | Oct. 31, 1939 |
| 2,375,564 | Leuck | May 8, 1945 |
| 2,383,793 | Harvey | Aug. 28, 1945 |
| 2,404,929 | Seymour | July 30, 1946 |
| 2,417,404 | Minsk | Mar. 11, 1947 |
| 2,443,167 | Minsk | June 8, 1948 |

FOREIGN PATENTS

| Number | Country | Date |
| --- | --- | --- |
| 356,408 | Great Britain | Sept. 10, 1931 |
| 369,313 | Great Britain | Mar. 24, 1932 |
| 592,233 | Germany | Feb. 3, 1934 |
| 102,849 | Sweden | Aug. 21, 1941 |

Certificate of Correction

Patent No. 2,485,239 October 18, 1949

EMMETTE FARR IZARD

It is hereby certified that error appears in the printed specification of the above numbered patent requiring correction as follows:

Column 10, line 23, for "88/14" read *86/14*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*